3,380,927
BROAD SPECTRUM SURFACE ACTIVE AGENT AND METHOD OF MAKING THE SAME

Sidney M. Edelstein, Englewood, N.J., and Ernest Welles, Flushing, N.Y., assignors to Dexter Chemical Corporation, a corporation of New York
No Drawing. Filed Oct. 3, 1963, Ser. No. 313,426
17 Claims. (Cl. 252—308)

This invention relates to broad spectrum surface active agents comprising phosphate co-esters of aliphatic alcohols and nonionic adducts of ethylene oxide and organic compounds containing reactive hydrogen atoms, to a method of producing the co-esters, and to the use thereof for suspending insoluble particles in polar and non-polar media.

The co-esters of the invention are particularly useful as surface active agents since they exhibit to an extraordinary extent a synergistically-effective combination of wetting and dispersing powers in both polar and non-polar solvents, including water. Thus, the phosphate co-esters of the invention are extremely versatile and have a broad spectrum of surface active properties which, in many specific applications, permits the replacement of two or more conventional surface active agents, separately required for multiple functions desired in the particular application, by a single phosphate co-ester which achieves the same or better results.

The new surface active agent of this invention is an orthophosphate or polyphosphate ester of conjointly an aliphatic alcohol and a nonionic adduct of ethylene oxide and reactive-hydrogen-containing organic compounds. In the embodiment of greatest effectiveness these phosphate co-esters are acidic, that is, less than all of the protons supplied by the phosphorylating agent are taken up in the conjoint esterification with alcohol and nonionic adduct so as to give a final product of very low pH when dispersed in aqueous medium. Such acidic phosphate co-esters are extremely compatible with nonpolar media such as organic solvents and have wide utility in such systems. On the other hand, in polar media, particularly in aqueous solutions, it is preferred to neutralize the acidic co-ester with inorganic alkali or organic bases to ensure good compatibility and effectiveness in these systems.

In forming the co-esters of the invention, we use either orthophosphate or polyphosphate acids or anhydrides to conjointly esterify and link through a phosphate bridge the aliphatic alcohols and nonionic adducts. For example, orthophosphoric acid or its anhydride phosphorous pentoxide may be employed. In addition, the homologous series of straight chains of interlinked orthophosphate groups represented by polyphosphates, for example, pyrophosphoric acid and tripolyphosphoric acid can be used. We have achieved good results with a commercially available material containing about 105% of polyphosphoric acid.

As the aliphatic alcohol which is to be esterified in accordance with our invention, we use any $C_6$-$C_{16}$ monohydric aliphatic alcohol examples of which are any primary or secondary hexyl alcohol, 2-ethylhexyl alcohol, iso-octyl alcohol, iso-decyl alcohol, dodecyl alcohol, nonyl alcohol, hexadecyl alcohol and mixtures thereof. Excellent results may also be achieved with the so-called "oxo-process" alcohols made by the catalytic addition of carbon monoxide and hydrogen to monoethylenically unsaturated olefins and comprising mixtures of predominantly straight chain primary alcohols in the $C_6$ to $C_{13}$ range, or mixtures of isomers of a single alcohol such as iso-octyl alcohol and some of the others named specifically hereinabove.

As noted previously, the phosphate co-esters of the invention include as a reacted component a nonionic compound which is an adduct of ethylene oxide and an organic compound containing reactive hydrogen atoms. Such reactive hydrogens may be derived from hydroxy, carboxylic, amino or mercapto groups and thus many different organic compounds may be used for forming the adduct. For example, alkylated phenols substituted with one or more alkyl groups of 6 to 18 carbon atoms may be used, specifically, hexyl phenol, octyl phenol, dinonyl phenol, dodecyl phenol, and mono and di hexadecyl phenols. Aliphatic alcohols having 6 to 25 carbon atoms such as hexyl alcohol, octyl alcohol, decyl alcohol, oleyl alcohol, stearyl alcohol, cetyl alcohol, palmityl alcohol, and abietyl alcohol may be used. Another class of organic compounds containing reactive hydrogen atoms which may be employed for making nonionic adducts with ethylene oxide are aliphatic monocarboxylic acids having 6 to 20 carbon atoms per molecule. Examples are hexanoic acid, octanoic acid, lauric acid, palmitic acid, stearic acid, and rosin and its component abietic acid. In addition, partial esters of any of said carboxylic acids with polyhydric alcohols containing 2-6 hydroxy groups may be employed. Examples of such polyhydroxy compounds are ethylene, propylene, butylene, and hexylene glycols, glycerine, pentaerythritol, sorbitol and mannitol. Still another class of reactive-hydrogen-containing compounds which may be reacted with ethylene oxide to form nonionic adducts of utility in the invention are primary amines of 6 to 20 carbon atoms, examples of which are hexyl amine, octyl amine, nonyl amine, decyl amine, dodecyl amine and hexadecyl amine as well as di and tri amines of the same number of carbon atoms, e.g. ethylene diamine, diethylene triamine, etc. Finally, ethylene oxide adducts of alkyl mercaptans containing 6 to 20 carbons such as hexyl, octyl, nonyl, decyl, dodecyl and hexadecyl mercaptans may also be used.

Many of the above-described nonionic adducts may be purchased commercially in a prepared form such as the Igepals (ethylene oxide-alkyl phenol adducts), the Ethomeens (ethylene oxide-aliphatic amine adducts), Leonils (ethylene oxide-aliphatic alcohol adducts), Spans (ethylene oxide-sorbitan adducts), and others such as polyethylene glycol 200 mono stearate, polyethylene glycol 600 mono oleate and glycol mono stearate. These commercial products are all suitable for use as the nonionic adduct to be co-esterified with aliphatic alcohol and a phosphorylating agent in accordance with the invention. On the other hand, when not available commercially, the foregoing nonionic adducts may be readily made by conventional reaction of ethylene oxide with the organic compound containing the active hydrogen atoms. Generally speaking, anywhere from 1 to 40 mols of ethylene oxide may be reacted per mol of organic compound, with the water solubility or dispersability of the adduct usually increasing as the number of mols of reacted ethylene oxide increases.

In making the phosphate co-ester, the weight proportions of the $C_6$-$C_{16}$ monohydric aliphatic alcohol and the nonionic adduct may vary within the range of about 5 to 85 parts of the nonionic adduct per 100 parts total of the mixture of the alcohol and the adduct. Ordinarily, we use about 5 to 75 parts of the nonionic adduct per 100 parts total of the mixture of the adduct and the $C_6$-$C_{16}$ monohydric alcohol.

In carrying out the co-esterification reaction, we first mix the $C_6$-$C_{16}$ monohydric alcohol and the nonionic adduct in the proportions given above and then introduce gradually phosphorous pentoxide, orthophosphoric acid or polyphosphoric acid in such proportion that the molar ratio of the total number of mols combined of the $C_6$-$C_{16}$ monohydric alcohol and of the nonionic adduct to the total number of mols of phosphorylating agent, calculated as phosphorous pentoxide ($P_2O_5$), is within the range from about 1:1 to about 5:1. The reaction is exothermic and the addition of the phosphate material should be so controlled as to prevent the temperature from rising to the boiling point of the mixture. Generally speaking, the reaction temperature should be maintained not in excess of about 95° C. We have also found that a minimum temperature of about 50° C. is advisable for satisfactory commercial esterification in a reasonable period of time, although the reaction will proceed at lower temperatures at a slower rate. Preferably, the reaction mixture is vigorously stirred during the addition of the phosphorylating agent to ensure a uniform and maximum rate of reaction within the controlled range of temperatures.

After all of the phosphorylating agent has been added, the mixture is held at reaction temperatures for at least an additional half hour to insure completeness of reaction and then the mixture is cooled to room temperature. After separating out any unreacted phosphorylating agent, the phosphate co-ester of $C_6$–$C_{16}$ monohydric alcohol and nonionic adduct is obtained as an integral, chemically unified molecule.

It is thought that the molecules of $C_6$–$C_{16}$ monohydric alcohol and the nonionic adduct are linked together in the larger co-ester molecule through an intermediate orthophosphate bridge and that less than all of the orthophosphate protons are consumed by the ester bonds, so that chiefly monohydrogen orthophosphate and to a minor degree dihydrogen orthophosphate esters are obtained. This tends to be confirmed by the fact that the pH of the co-ester products described is ordinarily about 3 and within the range of about 1 to 3, as measured in a 1% by weight dispersion in water. The products are usually clear liquids which are soluble in polar and nonpolar organic solvents of a range of composition varying from ethylene glycols to hydrocarbons such as kerosene. The products may be either water soluble or water insoluble depending upon the proportion of ethylene oxide present in the nonionic adduct component. The co-esters may, of course, be solubilized in water by neutralization with inorganic alkalis such as alkali metal hydroxide or with organic bases such as strong amines or quaternary ammonium hydroxides.

The invention is further illustrated by description in connection with the following examples, proportions therein being expressed as parts by weight unless specifically stated to the contrary.

Example 1

In this example, surface active agents comprising phosphate co-esters of iso-decyl alcohol and a nonionic adduct of ethylene oxide and dinonyl phenol containing about 9.5 mols of ethylene oxide per mol of dinonyl phenol were made. In preparing the phosphate co-ester, the dinonyl phenol-ethylene oxide adduct was first mixed with the iso-decyl alcohol, with the adduct comprising 25% by weight of the mixture. Thereafter phosphorous pentoxide was slowly added to the mixture so that the temperature of the exothermic reaction did not rise above 95° C. When all of the phosphorous pentoxide had been added, the mixture was held at reaction temperature for an additional half hour and thereafter any unreacted pentoxide was removed by filtration.

A series of surface active agents were prepared with the described reactants, using different molar ratios of the sum of the total number of mols combined of iso-decyl alcohol and of dinonyl phenol-ethylene oxide adduct to the total number of mols of phosphorous pentoxide as specified in the following table:

| Ingredients | Molar Phosphation Ratio (Alcohol-Adduct/$P_2O_5$) | | |
| --- | --- | --- | --- |
| | 5/1 | 3/1 | 2/1 |
| Iso-decyl Alcohol (parts) | 65.5 | 60.4 | 55.0 |
| Dinonyl Phenol, ethylene oxide adduct (parts) | 21.9 | 20.1 | 18.3 |
| $P_2O_5$ (parts) | 12.6 | 19.5 | 26.7 |

Each of the surface active agents formed in accordance with the table given above were highly acidic materials having a pH in 1% aqueous dispersion within the range of 1 to 3 and possessed exceptional wetting and dispersing powers in various media as will be illustrated in examples to follow.

Example 2

In this example, a series of surface active agents were prepared comprising phosphate co-esters of iso-octyl alcohol and a nonionic adduct of ethylene oxide and nonyl phenol containing about 15 mols of ethylene oxide per each mol of nonyl phenol. The iso-octyl alcohol and nonyl phenol-ethylene oxide adduct were first mixed together, the weight of the nonionic adduct comprising about 50% of the total weight of the mixture, and phosphorous pentoxide was slowly added to the mixture as previously described so as to maintain the temperature of the exothermic reaction within the range from 50° to 90° C.

Specific products were prepared in varying molar ratio of the sum of the total number of mols combined of iso-octyl alcohol and of nonyl phenol-ethylene oxide adduct to the total number of mols of phosphorous pentoxide as in the following table:

| Ingredients | Molar Phosphation Ratio (Alcohol Adduct/$P_2O_5$) | | |
| --- | --- | --- | --- |
| | 5/1 | 3/1 | 2/1 |
| Iso-octyl Alcohol (parts) | 44.5 | 41.3 | 38.0 |
| Nonyl Phenol, ethylene oxide adduct (parts) | 44.5 | 41.3 | 38.0 |
| $P_2O_5$ (parts) | 11.0 | 17.4 | 24.0 |

Again each of the surface active agents prepared in accordance with the preceding table had excellent wetting and dispersing powers in various media to be illustrated in examples to follow.

Example 3

In this example, surface active agents comprising the phosphate co-ester of hexadecyl alcohol and a nonionic adduct of oleyl alcohol and ethylene oxide containing about 40 mols of ethylene oxide per each mol of oleyl alcohol were made. The hexadecyl alcohol and the oleyl alcohol-ethylene oxide adduct were first mixed together, with the weight of the adduct comprising 60% of the total weight of the mixture. Thereafter, phosphorous pentoxide was slowly added to control the temperature of the exothermic reaction to within the range of 50° to 95° C. as previously described and products were made in varying molar ratio of the sum of the total number of mols combined of iso-decyl alcohol and of oleyl alcohol-ethylene oxide adduct to the total number of mols of phosphorous pentoxide as given in the following table:

| Ingredients | Molar Phosphation Ratio (Alcohol-Adduct/$P_2O_5$) | | |
| --- | --- | --- | --- |
| | 5/1 | 3/1 | 2/1 |
| Hexadecyl Alcohol (parts) | 37.9 | 36.6 | 35.2 |
| Oleyl Alcohol, ethylene oxide adduct (parts) | 56.9 | 55.0 | 52.6 |
| $P_2O_5$ (parts) | 5.2 | 8.4 | 12.2 |

Each of the surface active agents prepared in accordance with the preceding table had exceptional wetting and dispersing powers in a specific end use application to be described in a following example.

Example 4

A thixotropic alkyd interior paint formulation was prepared by compounding an alkyd resin, pigments and the usual promoters and accelerators in an organic solvent and the property of thixotropy was obtained primarily by incorporating 2% by weight of Bentone into the alkyd paint formulation. Bentone is a registered trademark of National Lead Company for clay products resulting from ion exchange reactions between organic bases and bentonite. These products are recommended for use in thickening organic solvent systems by swelling or gelling of the specially-treated Bentone clay. In accordance with the manufacturer's instructions, the Bentone clay was premoistened with approximately 35% methyl alcohol and then whipped into the alkyd paint formulation with high shear equipment to ensure uniform dispersion of the Bentone particles. Shortly after this treatment, the paint formulation had thickened considerably. Attempts to incorporate the Bentone clay into the paint formulation without premoistening it were unsuccessful as the material simply lumped or balled and could not be uniformly dispersed even in the high shear equipment.

A similar alkyd paint formulation was made up, but in this case 0.1% by weight of the co-ester produced in accordance with the first column of the table given in Example 1 was also dissolved in the paint formulation. Thereafter, 3% by weight of the Bentone clay, without premoistening, was added to the paint formulation and incorporated therein by mixing with low shear equipment. Within a few minutes the Bentone material was uniformly dispersed in the paint formulation which thickened in the same way as with the high shear equipment used previously. Thus it was possible by use of the small amount of the co-ester to eliminate the premoistening step and to thoroughly incorporate the Bentone into the paint formulation without high shear forces. The same results were noted in duplicate tests with the other co-esters produced in Example 1.

Example 5

A paint remover was manufactured by thickening a mixture of chlorinated hydrocarbon solvents containing among other materials propylene dichloride. The chlorinated solvents were thickened by premoistening the Bentone clay mentioned in the previous example with 30% by weight of propylene carbonate. 5% by weight of the premoistened Bentone was then mixed into the chlorinated solvents with high shear equipment in order to uniformly disperse the Bentone material. Within a few minutes the Bentone material had swelled and more or less gelled and satisfactorily thickened the chlorinated solvents.

A similar paint remover was prepared, but in this case approximately 0.25% of a co-ester as prepared in column 1 of the table given in Example 2 was first dissolved in the chlorinated solvents. Thereafter, the Bentone clay in the same amount was mixed into the solvents without premoistening it with propylene carbonate. The dispersal of the Bentone particles was very readily accomplished in low shear mixing equipment and within a few minutes the particles swelled and thickened the chlorinated solvents in the same way as described previously. Again the premoistening step and the requirement for high shear mixing equipment were satisfactorily eliminated. The same results were noted in duplicate tests with the remaining co-esters produced in Example 2.

Example 6

A synthetic interior house paint was formulated by mixing a liquid organic and a liquid water phase to produce an oil in water emulsion paint. The organic phase and the water phase, which were each separately prepared, were composed of the following materials in the proportions given.

| Oil phase: | Lbs. |
|---|---|
| Polymerized linseed oil | 212 |
| Lead naphthenate | 10 |
| Cobalt naphthenate | 2 |
| Manganese naphthenate | 2 |
| Anionic surfactants | 3 |
| Nonionic surfactants | 5 |
| | 234 |

| Water phase: | |
|---|---|
| Ethylene glycol | 12 |
| Diethylene amine | 8 |
| Zinc oxide | 50 |
| Talc | 100 |
| Anionic surfactants | 8 |
| Nonionic surfactants | 4 |
| Water | 125 |
| | 307 |

The blend of anionic and nonionic surfactants in each of these phases and the amounts of the blends were selected to satisfy the particular dispersing functions required in each phase. Thus, in the oil phase, where solid lead, cobalt and manganese driers had to be dispersed in organic oil, more of the nonionic surfactant was found to be necessary to give adequate dispersion. In the case of the water phase, where insoluble solids such as zinc oxide and talc had to be dispersed, more of the anionic detergent was found to be necessary to adequately disperse these materials. As will be seen 3.4% by weight of a blend of different surfactants was required in the oil phase and 3.9% by weight of a blend was required in the water phase to achieve the required uniform dispersion of the solid ingredients in these phases.

The oil and water phases as formulated above were intermixed at high speed in conventional equipment and the final product was an oil in water emulsion paint having fair stability against resettling of solids, average flow properties and a somewhat limited scrubbability.

A second emulsion paint of the type described above was formulated, but in this case the blend of conventional anionic and nonionic surfactants used in the previous formulation were replaced by the co-ester prepared in column 1 of the table given in Example 3. More specifically, the oil and water phases before mixing were each separately prepared as follows:

| Oil phase: | Lbs. |
|---|---|
| Polymerized linseed oil | 212 |
| Lead drier naphthenate | 10 |
| Cobalt naphthenate | 2 |
| Manganese naphthenate | 2 |
| Example 3 co-ester | 8 |
| | 234 |

| Water phase: | |
|---|---|
| Ethylene glycol | 12 |
| Diethylene amine | 8 |
| Zinc oxide | 50 |
| Talc | 100 |
| Example 3 co-ester | 2.5 |
| Water | 125 |
| | 297.5 |

As will be noted, only about 1/6 as much co-ester was used in the water phase as compared to the blend of conventional surfactants that were previously used in this portion of the formulation.

Upon mixing of the oil and water phases, a uniform oil in water emulsion was obtained with low mixing speeds and the resulting emulsion paint was vastly improved in stability, in the flow properties during application and in the scrubbability of the cured paint film. This clearly illustrates the broad spectrum of wetting and dispersing powers which are possessed by the phosphate co-esters produced in accordance with the invention. In particular, it was an extremely valuable feature in this specific application to be able to eliminate the requirement for balancing more than one type of surfactant material to fit the requirements of each of the phases used to prepare the paint whereby actually better results were achieved by use of a single product in less quantity.

It will be understood that it is intended to cover all changes and modifications of the preferred embodiments of the invention, herein chosen for the purpose of illustration, which do not constitute departures from the spirit and scope of the invention.

We claim:
1. A surface active agent consisting essentially of a co-ester of (1) a phosphorous compound selected from the group consisting of phosphorous pentoxide, orthophosphoric acid and polyphosphoric acid, (2) an aliphatic monohydric alcohol containing from 6 to 16 carbon atoms, and (3) a nonionic adduct of ethylene oxide and an organic compound selected from the group consisting of alkylated phenols containing at least one alkyl group of 6 to 18 carbon atoms, aliphatic alcohols containing from 6 to 25 carbon atoms, aliphatic monocarboxylic acids containing from 6 to 20 carbon atoms, aliphatic amines containing 6 to 20 carbon atoms, and aliphatic mercaptans containing 6 to 20 carbon atoms, said nonionic adduct (3) containing from 1 to 40 mols of ethylene oxide per mol of said organic compound, and being present in the weight proportions of about 5 to 85 parts per 100 parts combined of said nonionic adduct (3) and said aliphatic monohydric alcohol (2), and the molar ratio of the total number of mols combined of said aliphatic monohydric alcohol (2) and of said nonionic adduct (3) to the total number of mols of said phosphorous compound (1), calculated as phosphorous pentoxide, being within the range from about 1:1 to about 5:1.

2. A surface active agent as in claim 1 wherein said nonionic adduct is a dinonyl phenol containing about 9.5 mols of ethylene oxide per mol of said phenol.

3. A surface active agent as in claim 1 wherein said nonionic adduct is a nonyl phenol containing about 15 mols of ethylene oxide per mol of said phenol.

4. A surface active agent as in claim 1 wherein said nonionic adduct is an oleyl alcohol containing about 40 mols of ethylene oxide per mol of said alcohol.

5. A surface active agent as in claim 1 wherein said phosphorous compound is phosphorous pentoxide.

6. A surface active agent as in claim 1 wherein said aliphatic monohydric alcohol is iso-octyl alcohol.

7. A surface active agent as in claim 1 wherein the weight proportion of said nonionic adduct is from about 5 to 75 parts per 100 parts combined of said nonionic adduct and said aliphatic monohydric alcohol.

8. A stable dispersion of finely-divided insoluble material dispersed in a liquid medium, said liquid medium containing a dispersing amount of the surface active agent of claim 1.

9. A dispersion as in claim 8 wherein said liquid medium is a substantially anhydrous organic liquid.

10. The process of making a surface active agent which comprises mixing (1) an aliphatic monohydric alcohol containing from 6 to 16 carbon atoms with (2) a nonionic adduct of ethylene oxide and an organic compound selected from the group consisting of alkylated phenols containing at least one alkyl group of 6 to 18 carbon atoms, aliphatic alcohols containing from 6 to 25 carbon atoms, aliphatic monocarboxylic acids containing from 6 to 20 carbon atoms, aliphatic amines containing 6 to 20 carbon atoms, and aliphatic mercaptans containing 6 to 20 carbon atoms, said nonionic adduct (2) containing from 1 to 40 mols of ethylene oxide per mol of said organic compound and being present in the weight proportions of about 5 to 85 parts per 100 parts of the mixture of said adduct (2) and said aliphatic monohydric alcohol (1), introducing into said mixture (3) a phosphorous compound selected from the group consisting of phosphorous pentoxide, orthophosphoric acid and polyphosphoric acid in such proportions that the total number of mols combined of said aliphatic monohydric alcohol (1) and of said nonionic adduct (2) to the total number of mols of said phosphorous compound (3), calculated as phosphorous pentoxide, is within the range from about 1:1 to about 5:1, and reacting said materials at a temperature not in excess of about 95° C. to form a co-ester having wetting and dispersing powers.

11. A process as in claim 10 wherein said reaction is carried out at temperatures within the range from about 50° C. to about 95° C.

12. A process as in claim 10 wherein said phosphorous compound is introduced at a controlled rate so as to maintain the reaction at said temperatures by the spontaneously-generated heat of the reaction.

13. A process as in claim 10 wherein said nonionic adduct is a dinonyl phenol containing about 9.5 mols of ethylene oxide per mol of said phenol.

14. A process as in claim 10 wherein said nonionic adduct is a nonyl phenol containing about 15 mols of ethylene oxide per mol of said phenol.

15. A process as in claim 10 wherein said nonionic adduct is an oleyl alcohol containing about 40 mols of ethylene oxide per mol of said alcohol.

16. A process as in claim 10 wherein said phosphorous compound is phosphorous pentoxide.

17. A surface active agent as in claim 1 neutralized with a base selected from the group consisting of alkali metal hydroxides, organic amines and quaternary ammonium hydroxides.

References Cited

UNITED STATES PATENTS

| 3,004,056 | 10/1961 | Nunn et al. | 260—980 X |
| 3,033,889 | 5/1962 | Chiddix et al. | 260—980 X |

FOREIGN PATENTS 547,860  10/1957  Canada.

LEON D. ROSDOL, *Primary Examiner.*

R. D. LOVERING, *Assistant Examiner.*